Sept. 24, 1968 A. LECOMTE 3,402,511
SUN ROOF CONTROL HANDLE
Filed March 22, 1967 2 Sheets-Sheet 2

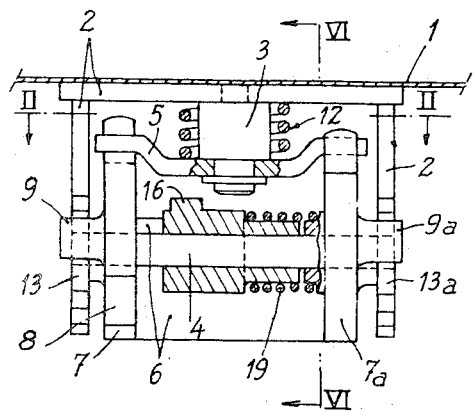
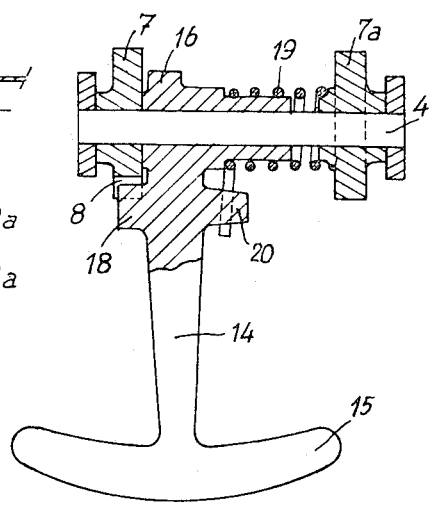
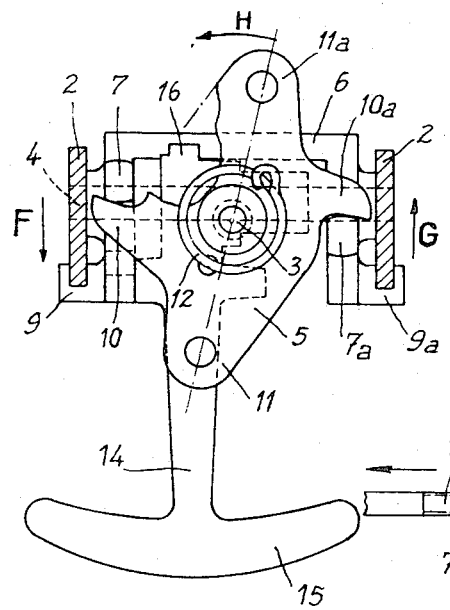
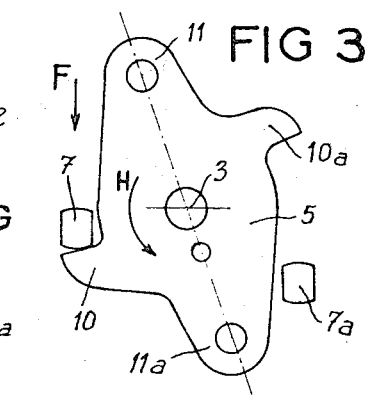
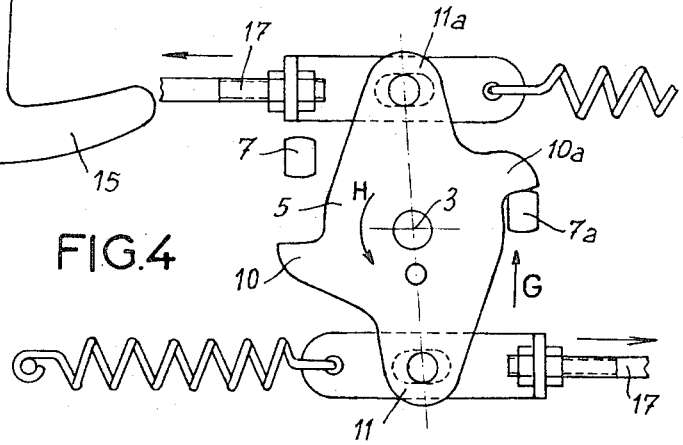

United States Patent Office 3,402,511
Patented Sept. 24, 1968

3,402,511
SUN ROOF CONTROL HANDLE
Alexandre Lecomte, Billancourt, France, assignor to Regie Nationale des Usines Renault, Billancourt, Hauts-de-Seine, France
Filed Mar. 22, 1967, Ser. No. 625,220
Claims priority, application France, Apr. 4, 1966, 56,286
5 Claims. (Cl. 49—449)

ABSTRACT OF THE DISCLOSURE

Device for controlling the members locking a sun roof or sliding panel of a vehicle, this device, which comprises a bracket secured to the panel, a pivoting lever formed with an integral handle, a bracket formed with two integral similar cams disposed in opposite directions, and a rocker responsive to said cams, so as to release the sliding panel from the aforesaid locking members, being characterised in that the pivoting lever can be moved either to an operative position in which it is operatively connected to said strap, thus permitting the release of said panel locking members and the sliding movement of said panel, or to an inoperative position in which the pivoting lever disconnected from said strap is recessed against the inner surface of the roof of the vehicle.

---

This invention relates to a handle-type lever device for controlling the opening and closing of the sun roof of a vehicle. This lever is adapted to be moved either to an operative position in which it can be seized for actuating the release mechanism and operate the movable sliding panel, and an inoperative position in which the handle is recessed with respect to the inner surface of the sliding panel, irrespective of the sliding panel position, thus avoiding any risk of hurting the driver or a passenger of the vehicle.

The control device to which this invention is applicable is of the type set forth in the patent application Ser. No. 535,177 of Mar. 17, 1966, now Patent No. 3,372,954.

In this prior patent application the control handle is solid with a strap carrying two antagonistic cams adapted, irrespective of the direction in which the handle is tilted, to actuate a rocker controlling the sun-roof release mechanism. In the neutral or inoperative position this handle constitutes a forwardly-inclined projection which may prove dangerous, especially when the sun roof panel is open with the handle located substantially above the head of the driver or passenger.

It is the object of the present invention to avoid this drawback and to this end this invention provides a device for controlling the sun roof or sliding panel of a vehicle which is essentially characterised in that its pivoting control lever or handle is adapted to assume either an operative position in which it is operatively connected to said strap, thus permitting the release of the sliding-panel locking members and the sliding movements of this panel, or an inoperative position in which the handle or control lever is disconnected from said strap and recessed in the inner surface of the roof.

Other features of this invention will appear as the following description proceeds with reference to the accompanying drawings illustrating diagrammatically by way of example a typical form of embodiment thereof. In the drawings:

FIGURE 1 is a front view of the control-lever assembly, illustrating the handle and rocker controlling the locking members, the handle being shown in its inoperative position;

FIGURE 2 is a section taken along the line II—II of FIGURE 1;

FIGURES 3 and 4 illustrate the mode of operation of the rocker;

FIGURE 5 illustrates the pivoting control lever in its operative position;

Figure 6:
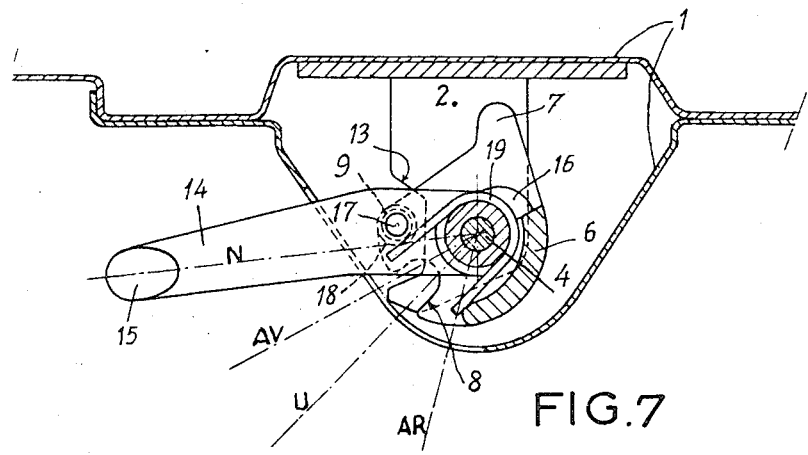
FIGURES 6, 7, 8 and 9 are views showing the mode of operation of the device, the rocker being omitted for the sake of clarity.

Referring firstly to FIGURES 1 and 2 of the drawings it will be seen that the roof of an automotive or other vehicle has mounted therein a sun roof or sliding panel 1 having secured thereto a support or bracket 2 in which a rocker 5 and a strap 6 are pivotally mounted by means of shafts 3 and 4 respectively, the side members of said strap 6 constituting a pair of similar but oppositely directed cams 7 and 7a; the cam 7 has a notch 8 formed therein (see FIGURES 1, 5 and 6) and is provided, like the other cam 7a, with lateral projections 9 and 9a.

Figure 7:
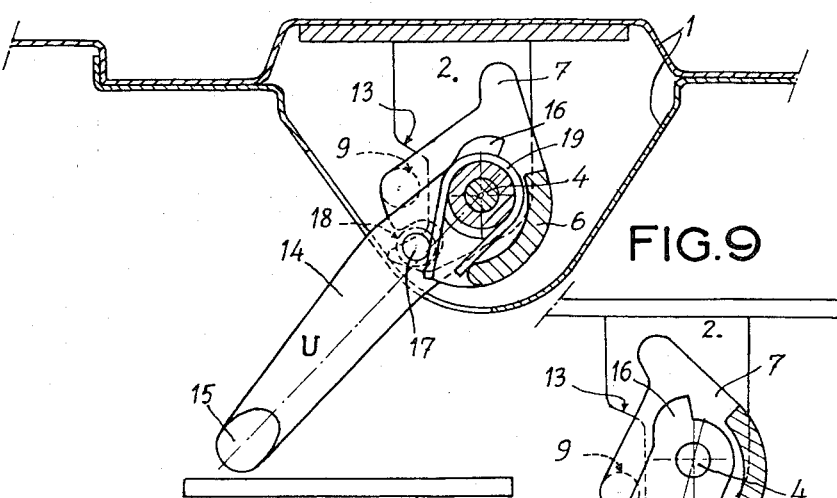

The rocker 5 comprises a pair of opposite shoulders 10 and 10a, and a pair of opposite arms 11 and 11a (FIGURE 2) disposed substantially symmetrically in relation to the axis of shaft 3, and is urged by a torsion spring 12 to an intermediate position in which its shoulders 10 and 10a are very close to the aforesaid cams 7 and 7a, respectively. As a result, the rotation of strap 6 in the direction of the arrow F or G (FIGURES 2, 3 and 4) causes the cam 7 (or 7a) to engage the rocker 5 and thus rotate the latter in the direction of the arrow H. The arms 11 and 11a will then actuate rods 17 shown in FIGURE 4 of the drawing and also in the aforesaid patent application, thus releasing the sliding panel 1 from the locking action of the retaining members described in said patent application. It will be noted that the pivoting movement of strap 6 is limited by the projections 9 and 9a solid with cams 7 and 7a respectively, these projections engaging the edges of notches 13 and 13a (FIGURES 1, 6 and 7) formed in the sides of bracket 2.

According to this invention, a lever 14 formed with an integral grip handle 15 at its lower or outer end is pivotally mounted on the shaft 4, this lever 14 comprising a radial projection 16 (FIGURES 2, 5, and 6 to 9), a lateral lug 20 and a lateral stud 18 opposite thereto and adapted to co-act with the notch 8 of cam 7. A compression and torsion spring 19 (see FIGURES 1, 5, 6 and 7), reacting against the strap 6 and against the lateral projection 20 of lever 14, urges this lever 14 towards the cam 7 and therefore the lateral stud 18 against the inner face of this cam.

Figures 8, 9:
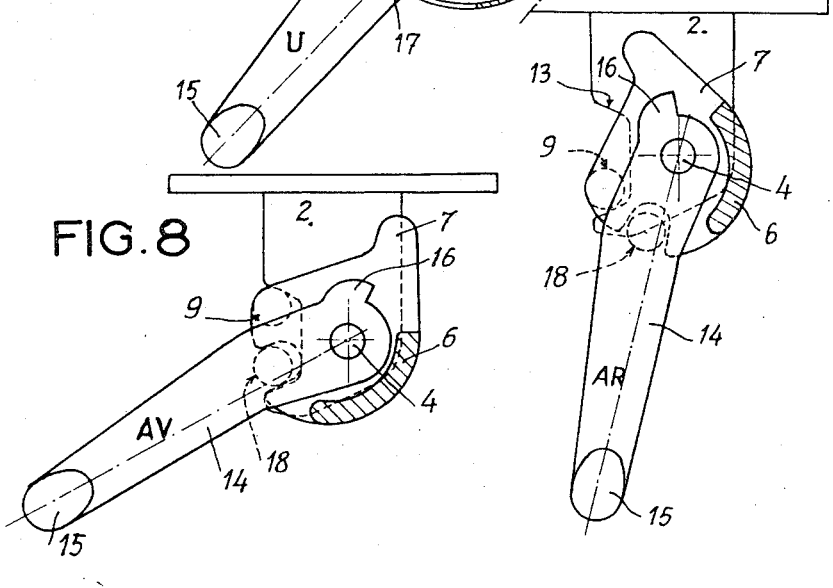

If this stud 18 engages the notch 8 the lever in the operative position U (FIGURE 7) can rotate the cams 7 and 7a by being moved either forwards (FIGURE 8, position AV), or backwards (FIGURE 9, position AR).

To restore the control lever 14 to its inoperative position N, it is only necessary to move same laterally, by causing it to slide along the shaft 4, against the resilient resistance of spring 19, so that the torsion stress exerted by this spring will tilt the lever 14 against the roof 1. The radial projection 16 rigid with lever 14 and engaging the strap 6 will limit the permissible upward movement of this lever.

When it is desired to move the sliding panel or sun roof 1, lowering the lever 14 will automatically causing same to be operatively connected to the strap 6, as the stud 18 engages the notch 8 of cam 7.

Of course, various modifications and variations may be brought to the specific form of embodiment of the invention which is shown and described herein, without inasmuch departing from the spirit and scope of the invention as set forth in the appended claims.

I claim:
1. Device for controlling the members locking a sun roof or sliding panel of a vehicle, this device, which comprises a bracket secured to the panel, a pivoting lever formed with an integral handle, a strap formed with two integral similar cams disposed in opposite directions, and a rocker responsive to said cams, so as to release the sliding panel from the aforesaid locking members, being characterised in that the pivoting lever can be moved either to an operative position in which it is operatively connected to said strap, thus permitting the release of said panel locking members and the sliding movement of said panel, or to an inoperative position in which the pivoting lever disconnected from said strap is recessed against the inner surface of the roof of the vehicle.

2. Device according to claim 1, characterized in that said pivoting lever urged by a return member towards the roof and against the inner face of one of said two cams is formed with a stud adapted to co-act with a notch of said cam when said lever is in its operative position.

3. Device according to claim 1 characterized in that said return member consists of a torsion and compression spring reacting against said two-cammed strap and against a lateral lug formed on said pivoting lever.

4. Device according to claim 1 characterized in that said lever is formed with an integral lug adapted, in its inoperative position, to engage said two-cammed strap to limit its upwards rotational movement.

5. Device according to claim 1 characterized in that when said sliding panel is moved forwards or backwards, the upwards or downwards tilting movement of said lever is stopped by means of projections formed integrally with said cams and adapted to engage the edges of notches formed by this purpose in the sides of said bracket.

References Cited
UNITED STATES PATENTS 3,372,954   3/1968   De Castelet _____ 296—137

DAVID J. WILLIAMOWSKY, *Primary Examiner.*

J. K. BELL, *Assistant Examiner.*